United States Patent
Fujimura

(10) Patent No.: US 9,923,596 B2
(45) Date of Patent: Mar. 20, 2018

(54) DEMODULATION APPARATUS

(71) Applicant: MITSUBISHI ELECTRIC CORPORATION, Chiyoda-ku (JP)

(72) Inventor: Akinori Fujimura, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/310,317

(22) PCT Filed: May 15, 2014

(86) PCT No.: PCT/JP2014/062971
§ 371 (c)(1),
(2) Date: Nov. 10, 2016

(87) PCT Pub. No.: WO2015/173928
PCT Pub. Date: Nov. 19, 2015

(65) Prior Publication Data
US 2017/0272117 A1    Sep. 21, 2017

(51) Int. Cl.
*H04B 1/7087*    (2011.01)
*H04B 1/7075*    (2011.01)

(52) U.S. Cl.
CPC ......... *H04B 1/7087* (2013.01); *H04B 1/7075* (2013.01)

(58) Field of Classification Search
CPC ............................ H04B 1/7087; H04B 1/7075
(Continued)

(56) References Cited

U.S. PATENT DOCUMENTS

| 5,579,338 A | 11/1996 | Kojima | |
| 6,456,648 B1* | 9/2002 | Bultan | H04B 1/7085 375/148 |
| 2011/0013674 A1* | 1/2011 | Takeda | H04B 1/7085 375/147 |

FOREIGN PATENT DOCUMENTS

EP    1 047 235 A1    10/2000
JP    5-327657 A    12/1993
(Continued)

OTHER PUBLICATIONS

Office Action dated May 9, 2017 in Japanese Patent Application No. 2016-519052 ( with English translation).
(Continued)

*Primary Examiner* — Michael Neff
(74) *Attorney, Agent, or Firm* — Oblon, McClelland, Maier & Neustadt, L.L.P.

(57) ABSTRACT

A demodulation apparatus demodulates spectrum-spread received data, and includes a band variable filter removing noise components from despread received data, a power conversion unit converting each sample value of received data after removing noise components to a power value, a cyclic addition unit cyclically adding the power value in bit periods of received data, a maximum-value detection/average-level measurement unit detecting a maximum value from a cyclic-addition result of the cyclic addition unit, an estimation unit estimating a spreading-code timing and a carrier frequency based on maximum-value information detected by the maximum-value detection/average-level measurement unit, a spreading-code generation unit generating a spreading code with a timing according to an estimation result of a spreading-code timing obtained by the estimation unit, and a local-signal generation unit setting a local-signal frequency according to an estimation result of a carrier frequency obtained by the estimation unit.

10 Claims, 9 Drawing Sheets

(58) Field of Classification Search
USPC .......................................................... 375/150
See application file for complete search history.

(56) References Cited

FOREIGN PATENT DOCUMENTS

| | | |
|---|---|---|
| JP | 7-140224 A | 6/1995 |
| JP | 10-282210 A | 10/1998 |
| JP | 3498600 B2 | 12/2003 |
| JP | 2009-33702 | 2/2009 |
| JP | 5094469 B2 | 9/2012 |
| WO | WO 98/57453 | 12/1998 |

OTHER PUBLICATIONS

International Search Report dated Aug. 12, 2014 in PCT/JP2014/062971 filed May 15, 2014.
Keishi Takeda, et al. "A Study on Bit Rate Estimation Using Received Signal Power" The 2007 Institute of Electronics, Information and Communication Engineers (IEICE) Conference, 2007, p. 259 (with partial English translation).
European Search Report dated Nov. 13, 2017 in European Application No. 14891839.4 (8 pages).
Canadian Office Action dated Oct. 5, 2017 in Canadian Application No. 2,949,026 (4 pages).

\* cited by examiner

DEMODULATION APPARATUS

FIELD

The present invention relates to a demodulation apparatus that despreads and demodulates a received signal in a spread spectrum communication system.

BACKGROUND

In a spread spectrum communication system, a communication device on the transmission side (a transmitter) performs primary modulation on transmission data, and further multiplies data obtained by the primary modulation by a spreading code to perform spread spectrum processing. The communication device then converts a signal obtained by performing spread spectrum processing into a signal with a radio-frequency band, and thereafter transmits the signal obtained by the conversion to a counterpart communication device (receiver). Meanwhile, upon reception of the signal from the counterpart communication device, the communication device on the reception side despreads the received signal by multiplying the received signal by a spreading code that is the same as the spreading code having been used for the multiplication of the communication device on the transmission side, in synchronization with a desired timing, integrates energy of the despread signal over a spreading-code period, and further performs bit determination based on an addition result obtained by adding the integration results.

As a conventional technique applicable to the communication device on the reception side in the spread spectrum communication system, there is a data decoding circuit described in Patent Literature 1 listed below, for example. The data decoding circuit described in Patent Literature 1 listed below utilizes a cross-correlation value to determine a spreading-code period, obtains a bit-data correlation value in a period identical to the spreading-code period so as to accurately perform bit determination, and demodulates the received signal.

CITATION LIST

Patent Literature

Patent Literature 1: Japanese Patent Application Laid-open No. H5-327657

SUMMARY

Technical Problem

However, the data decoding circuit described in Patent Literature 1 listed above is presumed to be applicable to a so-called synchronous system in which a bit-data period (bit period of data) and a spreading-code period are in an integral multiple relation (including a case where both are equal), but has not been considered to be applied to a system in which the bit-data period and the spreading-code period are in a non-integral-multiple relation, that is, an asynchronous system.

For that reason, if the above-mentioned data decoding circuit is applied to an asynchronous system in which bit data change in the middle of the spreading-code period, the energy amount obtained after integrating and adding the energy of a received signal may be lower than an ideal energy amount. This results in a problem that a synchronization accuracy is deteriorated.

Meanwhile, in the case where a spread spectrum communication system is implemented by applying the conventional data decoding circuit while suppressing deterioration of the synchronization accuracy, design thereof requires consideration that the bit-data period and the spreading-code period should be in an integral-multiple relation. Therefore, there has been a problem in that the bit-data period, that is, a bit rate cannot be set arbitrarily.

Another method is considered in which as a pilot signal for spreading-code synchronization or carrier-frequency synchronization, a spreading code different from the spreading code for the above-mentioned data communication is separately multiplexed and transmitted, and a receiver uses this pilot signal to perform spreading-code synchronization or carrier-frequency synchronization. However, in this case, a portion of a power resource on the transmission side is allotted to the pilot signal. As a result, signal power used originally for data communication is decreased. This causes a further problem such as reduction in communication distance.

The present invention has been achieved in view of the above circumstances, and an object of the present invention is to provide a demodulation apparatus that is capable of achieving code synchronization, carrier-frequency synchronization or bit synchronization without using a pilot signal regardless of the relation between a bit-data period and a spreading-code period, that is, even in the asynchronous system described above, and performing demodulation while suppressing deterioration of a bit-error rate.

Solution to Problem

In order to solve the above-mentioned problem and achieve the object, the present invention provides a demodulation apparatus that demodulates spectrum-spread received data, the apparatus comprising: a filter unit that removes noise components from despread received data; a power conversion unit that converts each sample value of received data after removing noise components to a power value; a cyclic addition unit that cyclically adds the power value in bit periods of received data; a maximum-value detection unit that detects a maximum value from cyclic-addition results of the cyclic addition unit; an estimation unit that estimates a spreading-code timing and a carrier frequency based on maximum-value information detected by the maximum-value detection unit; a spreading-code generation unit that generates a spreading code according to an estimation result of a spreading-code timing obtained by the estimation unit; and a local-signal generation unit that sets a local-signal frequency according to an estimation result of a carrier frequency obtained by the estimation unit.

Advantageous Effects of Invention

According to the present invention, it is possible to realize a demodulation apparatus that does not have deterioration of demodulation performance even when a bit-data period and a spreading-code period are not synchronized.

DESCRIPTION OF EMBODIMENTS

Embodiments of a demodulation apparatus according to the present invention will be described below in detail with reference to the drawings. The present invention is not limited to the embodiments.

First Embodiment

Figure 1:
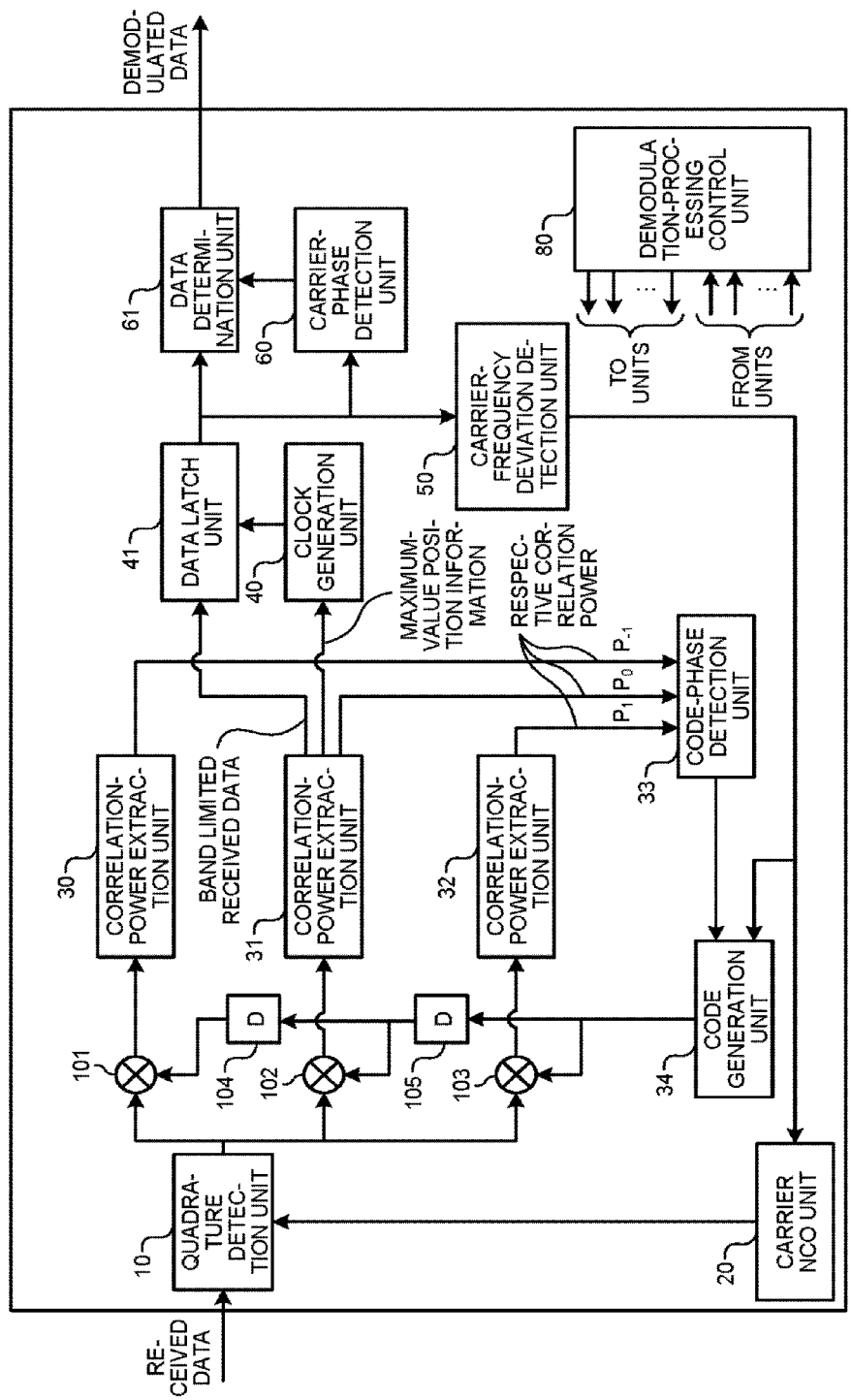
FIG. 1 is a diagram illustrating a configuration example of a demodulation apparatus according to a first embodiment of the present invention.

FIG. 1 is a diagram illustrating a configuration example of a demodulation apparatus according to a first embodiment of the present invention. As illustrated in FIG. 1, the demodulation apparatus is configured to include a quadrature detection unit 10, a carrier NCO (numerically control oscillator) unit 20, correlation-power extraction units 30, 31 and 32, a code-phase detection unit 33, a code generation unit 34, a clock generation unit 40, a data latch unit 41, a carrier-frequency deviation detection unit 50, a carrier-phase detection unit 60, a data determination unit 61, a demodulation-processing control unit 80, multipliers 101, 102 and 103, and flip-flops 104 and 105.

The demodulation apparatus illustrated in FIG. 1 demodulates a spread spectrum signal in a receiver that constitutes a communication device in a spread spectrum communication system.

Figure 2:
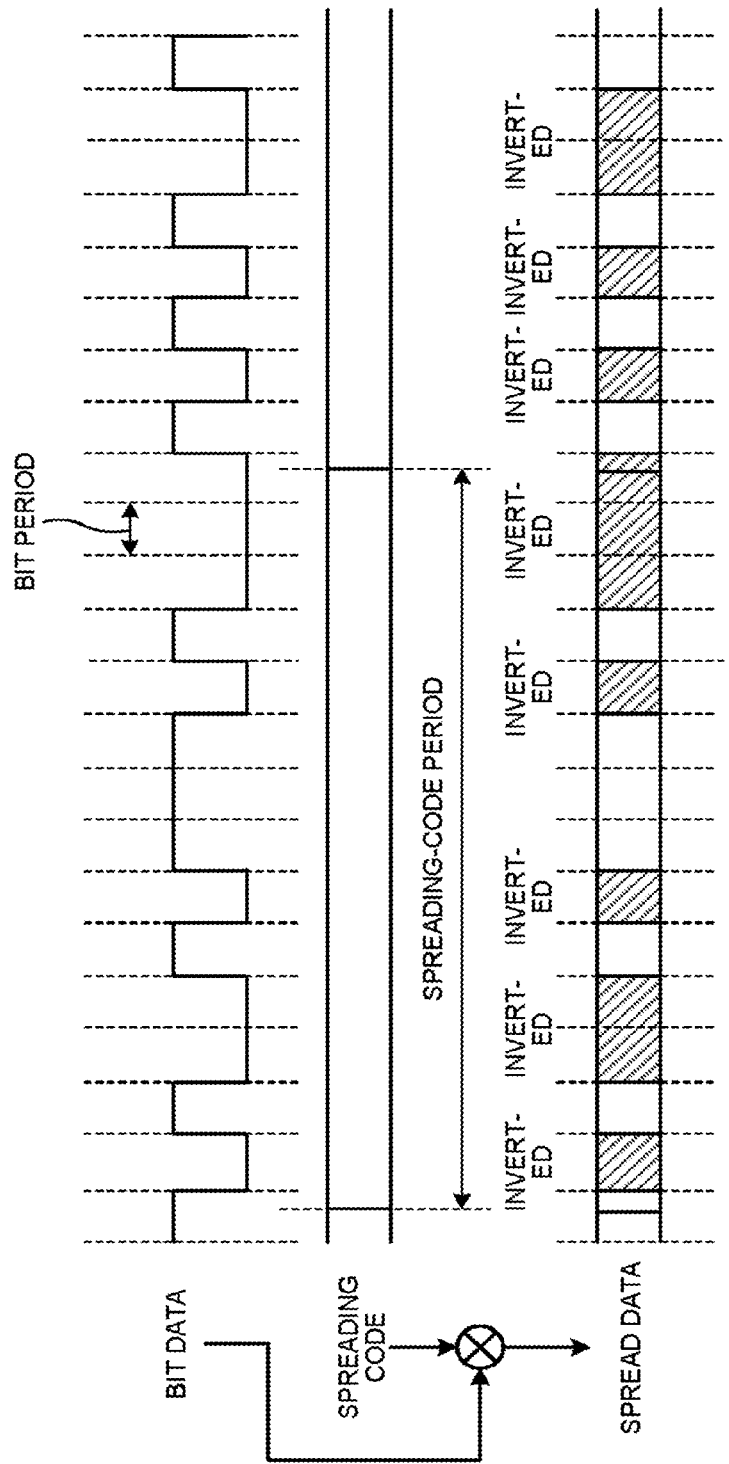
FIG. 2 is a chart illustrating an example of spread spectrum processing performed by a communication device on the transmission side.

First, the features of the demodulation apparatus according to the present embodiment are described with reference to FIG. 2. As illustrated in FIG. 2, even when a spreading-code period and a bit period (period of bit-data) are in a non-integral-multiple relation, the demodulation apparatus of the present embodiment achieves spreading-code synchronization, carrier-frequency synchronization, bit synchronization and carrier-phase synchronization, and as a result, demodulates the data with improved bit-error rate characteristics. FIG. 2 is a chart illustrating an example of spread spectrum processing performed by a communication device on the transmission side.

As illustrated in FIG. 2, even when a period of bit data in which information is to be transmitted is in a non-integral-multiple relation with the spreading-code period, the communication device on the transmission side multiplies the bit data by the spreading code so as to perform spread spectrum processing. The spreading code (also referred to as "PN (pseudo random) code") illustrated in FIG. 2 is expressed in period of the spreading code for the purpose of simplifying the description, but in practice, the spreading code includes a random sequence of about several hundreds to several tens of thousands of chips per code length.

In this case, as illustrated in FIG. 2, in the spectrum-spread data, a sign {inversion, non-inversion} of the spreading code is determined per bit period regardless of the spreading-code period.

The demodulation apparatus according to the present embodiment is capable of demodulating this spread data as illustrated in FIG. 2 independently without using a further synchronizing signal such as a pilot signal. In addition, the demodulation apparatus according to the present embodiment easily achieves a variable bit rate.

Demodulation processing performed by the demodulation apparatus of the present embodiment is described below in detail.

First, basic operations of the correlation-power extraction unit 31 illustrated in FIG. 1 are described. Configurations of the correlation-power extraction units 30 and 32 and operations of each constituent element of these units are the same as those of the correlation-power extraction unit 31. Therefore, descriptions of the configuration of the correlation-power extraction units 30 and 32 and the operations of each constituent element of these units are omitted.

The correlation-power extraction unit 31 is a core unit for demodulation processing. This unit can extract a cross-correlation power between a received signal and a spreading-code replica (spreading code generated by the code generation unit 34) even when a bit-data period and a spreading-code period are in a non-integral-multiple relation.

Figure 3:
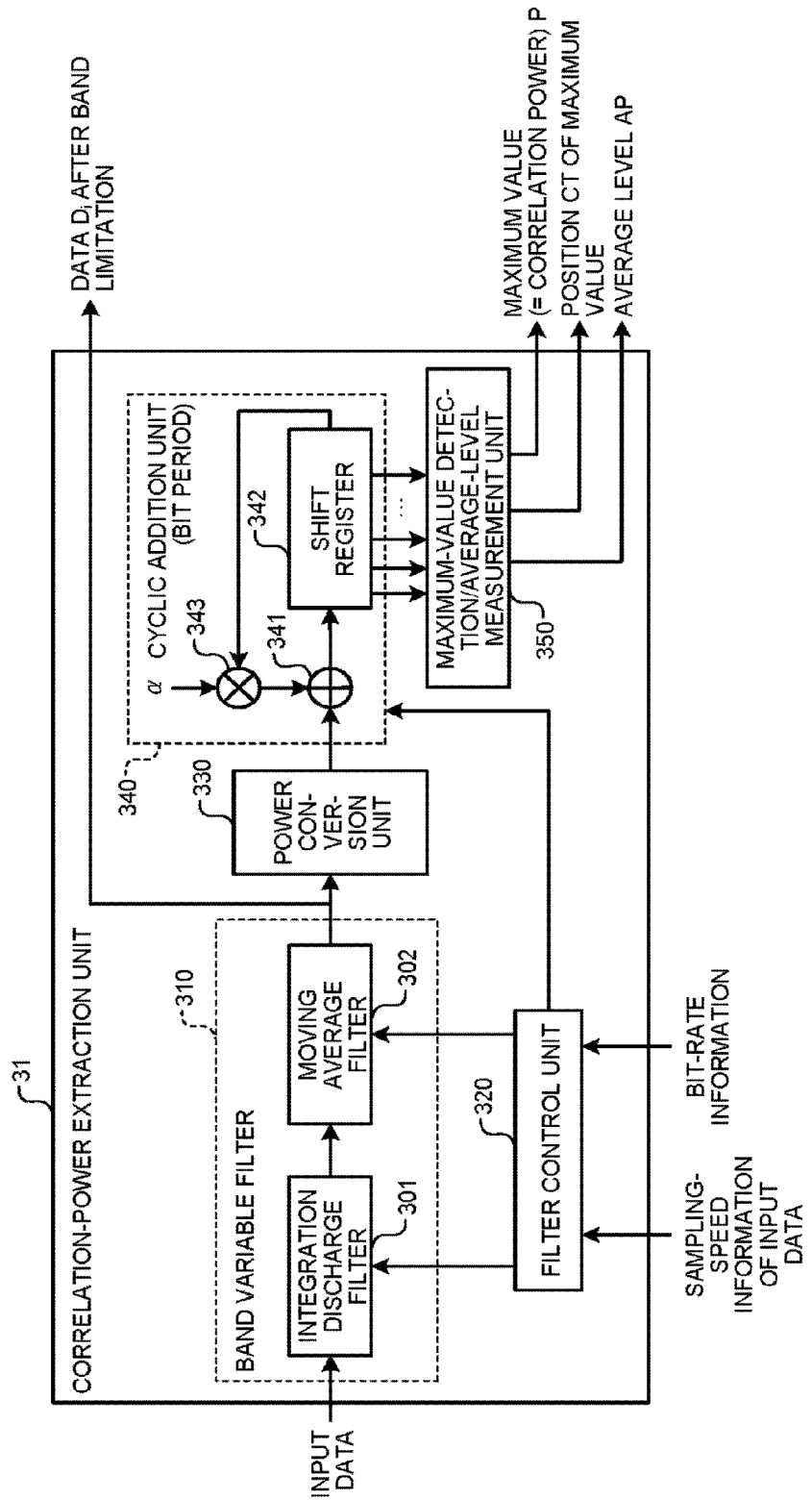
FIG. 3 is a diagram illustrating a configuration example of a correlation-power extraction unit.

FIG. 3 is a diagram illustrating a configuration example of the correlation-power extraction unit 31. As illustrated in FIG. 3, the correlation-power extraction unit 31 includes a band variable filter 310 constructed of an integration discharge filter 301 and a moving average filter 302, a filter control unit 320, a power conversion unit 330, a cyclic addition unit 340 constructed of an adder 341, a shift register 342 and a multiplier 343, and a maximum-value detection/average-level measurement unit 350.

As illustrated in FIG. 1, at the previous stage of the correlation-power extraction unit 31, a spreading-code replica generated by the code generation unit 34 is multiplied by received data via the flip-flop 105. Before being multiplied by the spreading code, the received data is converted in domain from an intermediate frequency to a baseband frequency by the quadrature detection unit 10. That is, the received data outputted from the quadrature detection unit 10 are expressed as a complex number of I and Q. Although not illustrated, analog-to-digital conversion (sampling) is supposed to be performed at an upstream of the quadrature detection unit 10, or immediately after the quadrature detection unit 10.

Figure 4:
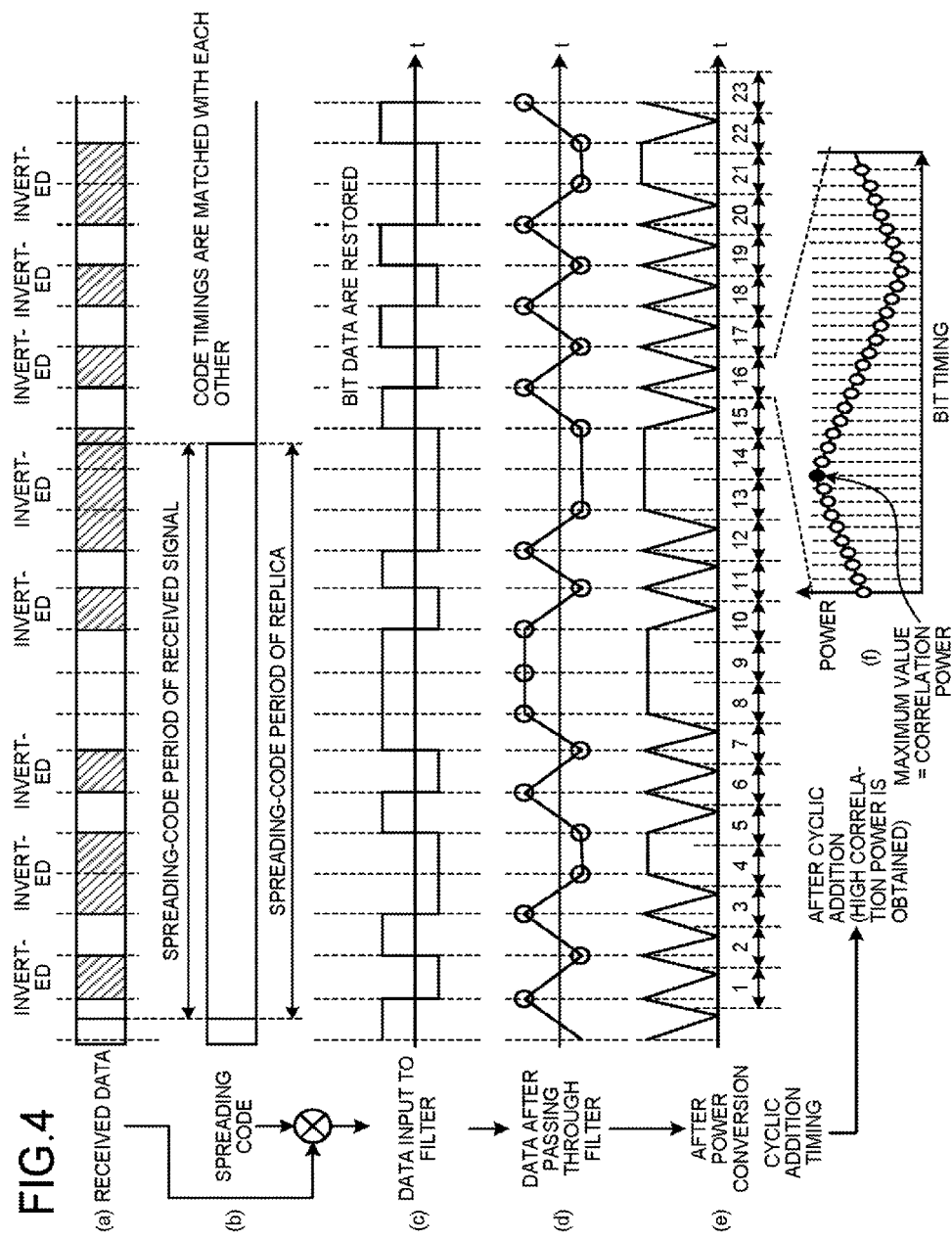
FIG. 4 is a chart illustrating operation examples of the correlation-power extraction unit.

Operations of the correlation-power extraction unit 31 are described with reference to FIGS. 3, 4 and 5. In data inputted in the correlation-power extraction unit 31, for example as illustrated in (a) and (b) of FIG. 4, when a delimiter of a spreading code of the received data is aligned with a delimiter of the spreading-code replica generated by the code generation unit 34 (that is, when spreading-code synchronization is established), and when a carrier-frequency deviation is completely removed (that is, when carrier-frequency synchronization is established), the bit data are restored as illustrated in FIG. 4(c). FIG. 4(c) illustrates the data inputted to the correlation-power extraction unit 31, that is, the input data to the band variable filter 310.

Figure 5:
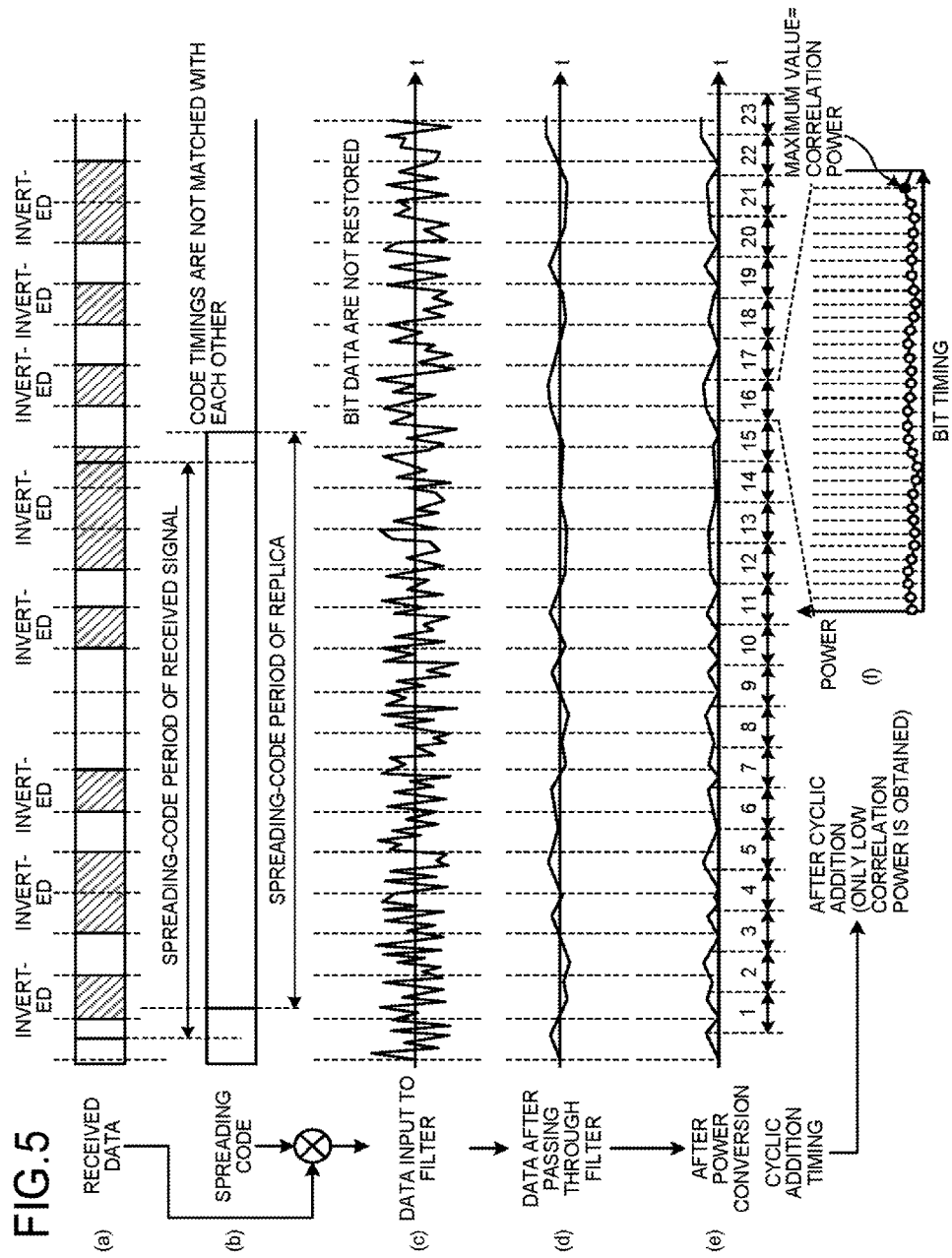
FIG. 5 is a chart illustrating operation examples of the correlation-power extraction unit.

On the other hand, as illustrated in (a) and (b) of FIG. 5, when a delimiter of the spreading code of the received data is not aligned with a delimiter of the spreading-code replica generated by the code generation unit 34 (that is, when spreading-code synchronization is not established), or when there is a carrier-frequency deviation (that is, when carrier-frequency synchronization is not established), the input data has random waveform as illustrated in FIG. 5(c) for example, and thus the bit data are not restored.

Accordingly, whether or not spreading-code synchronization and carrier-frequency synchronization are both established can be detected by detecting whether or not the bit data illustrated in FIG. 4(c) and FIG. 5(c) have been restored. However, on an actual propagation path for a spread spectrum signal, Gaussian noise is predominant, and is added to the received signal. Thus, there are too many noise components thereby making it impossible at the stage of FIG. 4(c) and FIG. 5(c) to determine whether or not the bit data have been restored.

In the demodulation apparatus according to the present embodiment, the correlation-power extraction unit 31 performs a filtering process, a power adding process and a maximum-value detecting process, which are described below, to extract a cross-correlation power between a received signal and a spreading-code replica generated by the code generation unit 34, thereby to remove noise components from the input data.

In the case where the correlation-power extraction unit 31 extracts a cross-correlation power, the band variable filter 310 first limits the received signal to a bandwidth corresponding to a bit rate so as to remove out-of-band noise components from the received signal. As illustrated in FIG. 3, the band variable filter 310 is configured by the integration discharge filter 301 and the moving average filter 302. However, when a high-speed operation and increase in the number of shift-register stages are allowable, the band variable filter 310 may be configured by only the moving average filter 302. In this case, it suffices that a duration of the moving average performed by the moving average filter 302, that is, the number of moving-average stages is set according to the bit period of the received signal. Hereinafter, for the sake of simplicity, description is hereinafter given for an operation in the case where the band variable filter 310 is configured by only the moving average filter 302.

In order to achieve a variable band, that is, a variable bit rate, when the bit rate is higher (=when the bit period is shorter), the number of moving-average stages should be controlled to be smaller, and when the bit rate is lower (=when the bit period is longer), the number of moving-average stages should be controlled to be larger. This control is executed by the filter control unit 320 based on bit-rate information of the received signal, and sampling-speed information of the input data. In a case where a variable bit rate is unnecessary, such control as described above is not necessary.

FIG. 4(d) illustrates a waveform obtained after restored bit data (FIG. 4(c)) that is the input data have been subjected to moving average in the bit period, on the condition that spreading-code synchronization and carrier-frequency synchronization are established. Because the moving average is performed on baseband signals in practice, the moving average is performed respectively in an I-channel component and a Q-channel. In this case, as illustrated in FIG. 4(d), the signal waveform after performing the moving average becomes a triangular waveform. If each piece of data marked with a circle in FIG. 4(d) can be sampled with the bit clock, a signal with the highest S/N ratio can be obtained. By performing phase detection on the sampled signal with a high S/N ratio, improved bit-error rate characteristics can be obtained. Each piece of data marked with a circle corresponds to a cross-correlation value between a received signal obtained in a duration of the bit period, and a spreading-code replica generated by the code generation unit 34.

Through the subsequent processes, the correlation-power extraction unit 31 identifies a position of each piece of data marked with a circle, and also outputs information of power integration of each piece of data marked with a circle, that is, cross-correlation data obtained in the bit period.

On the condition that spreading-code (or carrier-frequency) synchronization is not established as illustrated in FIG. 5(d), only noise components are inputted to the correlation-power extraction unit 31. Therefore, even the output of the band variable filter 310 after moving average is performed on the noise components, cannot have a high amplitude, but a waveform with unregulated low amplitude is outputted.

Next, the power conversion unit 330 converts baseband data (I, Q) outputted from the band variable filter 310 (moving average filter 302) to power data R ($=I^2+Q^2$). On the condition that spreading-code synchronization and carrier-frequency synchronization are established, a triangular waveform illustrated in FIG. 4(d) behaves in a way to have its negative amplitude replicated on the positive side, and thereby as illustrated in FIG. 4(e), the triangle waveform is converted to a power-data sequence with components having a frequency twice that of the triangular wave.

Next, the cyclic addition unit 340 cyclically adds power data outputted from the power conversion unit 330 in bit periods.

The number of stages of the shift register 342 within the cyclic addition unit 340 is set by the filter control unit 320, and is set to a value identical to the number of moving-average stages of the moving average filter 302 located at the previous stage.

For example, when a bit period of the received data is equivalent to an average duration of 1022 stages of the moving average filter 302, the number of stages of the moving average filter 302 and the number of stages of the shift register 342 within the cyclic addition unit 340 are both set to 1022 stages. When a bit period of the received data is equivalent to an average duration of 32 stages of the moving average filter 302, the number of stages of the moving average filter 302 and the number of stages of the shift register 342 within the cyclic addition unit 340 are both set to 32 stages. As described above, the number of moving-average stages is set according to the bit period, and resultingly, the number of shift-register stages within the cyclic addition unit 340 is also set according to the bit period. In a case where the demodulation apparatus is adapted to multiple bit rates, it suffices to design the demodulation apparatus such that the aforementioned number of moving-average stages and the aforementioned number of shift-register stages within the cyclic addition unit 340 can be set variable (for example, {32 stages, 1022 stages}) according to multiple bit periods.

In a case where out-of-band noise components are removed by only the moving average filter 302, a state where a sampling speed of the data inputted to the correlation-power extraction unit 31 is hundreds or more times higher than the bit rate (for example, 1022 stages as described above) leads to oversampling that is higher than the bit rate in the processes on or after the moving average filter 302 within the correlation-power extraction unit 31, thereby incurring increase in power consumption and increase in the number of stages of each shift register of the moving average filter 302 and the cyclic addition unit 340. As countermeasures for occurrence of such problem, the integration discharge filter 301 illustrated in FIG. 3 is put in at the previous stage of the moving average filter 302.

The integration discharge filter 301 is described. Where the number of stages of the integration discharge filter 301 is defined as D, the integration discharge filter 301 repeats an operation of integrating D pieces of continuously-inputted data and outputting the integration result. When the integration result is outputted, the integrated value is cleared (discharged), and then the integration discharge filter 301 integrates D pieces of subsequent continuously-inputted data. Thereafter, the same process is repeated. With this process, noise components included in the input data can be reduced, and also the data sampling speed can be decreased. That is, the sampling speed for data outputted by the integration discharge filter 301 can be decreased to 1/D of a sampling speed of the input data.

For example, in a case where the sampling speed for data inputted to the correlation-power extraction unit 31 is 320 times as high as the bit rate, a configuration that does not have the integration discharge filter 301 requires 320 stages as the number of stages of each shift register of the moving average filter 302 and the cyclic addition unit 340, and the operating speed is also 320 times as high as the bit rate to lead to a high speed operation. Meanwhile, on the same conditions, a configuration having integration discharge filter 301 only needs to set D=20 as the number of stages D of the integration discharge filter 301, for example, thereby making it possible to reduce the operating speed on or after the output of the integration discharge filter 301 to a speed that is 16 (=320/20) times higher than the bit rate. Accordingly, 16 stages suffice for each shift register of the moving average filter 302 and the cyclic addition unit 340. As described above, by additionally incorporating the integration discharge filter 301, the circuit size and power consumption can be reduced.

By designing the integration discharge filter 301 such that the number of stages D thereof is set to be variable, the demodulation apparatus can be adapted to various bit rates. For example, there are three types of bit rates, which are respectively {1/32 times, 1/128 times, 1/1024 times} as high as the sampling speed of the data inputted to the correlation-power extraction unit 31 (that is, when the number of oversamples with respect to the bit rate is {32, 128, 1024}). In this case, the integration discharge filter 301 is designed such that the number of stages D thereof can be set to any of three different values {2 stages, 8 stages, 64 stages}, and the number of stages of each shift register of the moving average filter 302 and the cyclic addition unit 340 is set to 16 stages. Accordingly, the demodulation apparatus can be adapted to three types of bit rates, while reducing the circuit size and power consumption.

Setting of the number of stages in each shift register in the manner as described above is performed by the filter control unit 320. The filter control unit 320 acquires sampling-speed information of the input data and bit-rate information of the received data from the demodulation-processing control unit 80 (see FIG. 1). Based on these acquired two kinds of information, the filter control unit 320 decides the number of stages of the integration discharge filter 301 and the number of stages of each shift register of the moving average filter 302 and the cyclic addition unit 340, and sets the decided numbers of stages in these filters and addition unit.

The bit-rate information and the input-data sampling speed information to be inputted from the demodulation-processing control unit 80 to the filter control unit 320 are given from a higher-order system (for example, a CPU) to the demodulation-processing control unit 80 before the start of communication.

Returning to the description on the cyclic addition unit 340, in the cyclic addition unit 340, the data outputted from the shift register 342 are multiplied by a forgetting coefficient α in the multiplier 343, and the after-multiplication data are added to the subsequent input data from the power conversion unit 330 by the adder 341. The after-addition data are inputted to the shift register 342 again. Depending on the forgetting coefficient α (0<α<1), a time constant of the cyclic addition unit 340 is decided. As the value of α is larger, the time constant becomes greater, thereby increasing the resistance to noise. However, as the value of α becomes larger, tracking performance to a bit-phase shift is more impaired. Therefore, the value of α is set appropriately according to a system to be applied. The forgetting coefficient α may be set to 1 in an initial capture operation of repeatedly checking presence or absence of correlation and resetting this circuit (correlation-power extraction unit 31) many times while changing the conditions. In that case, there is an additional constraint of checking presence or absence of correlation within a certain amount of time in which the cyclic-addition result does not undergo overflow. However, because of α=1, a process of multiplication of α is eliminated thereby to lead to reduction in the amount of computation.

Where a power-data sequence outputted from the power conversion unit 330 is defined as $R_i$ (i=0, 1, 2, . . . ), and for example, the number of stages of the shift register 342 is set to M=8 stages, and the number of times of cyclic addition is set to J=4, values $C_0$ to $C_7$ within the shift register 342 after four times of cyclic addition are expressed as the following equations (1) to (8), respectively.

$$C_0 = R_0 \times \alpha^3 + R_8 \times \alpha^2 + R_{16} \times \alpha + R_{24} \quad (1)$$

$$C_1 = R_1 \times \alpha^3 + R_9 \times \alpha^2 + R_{17} \times \alpha + R_{25} \quad (2)$$

$$C_2 = R_2 \times \alpha^3 + R_{10} \times \alpha^2 + R_{18} \times \alpha + R_{26} \quad (3)$$

$$C_3 = R_3 \times \alpha^3 + R_{11} \times \alpha^2 + R_{19} \times \alpha + R_{27} \quad (4)$$

$$C_4 = R_4 \times \alpha^3 + R_{12} \times \alpha^2 + R_{20} \times \alpha + R_{28} \quad (5)$$

$$C_5 = R_5 \times \alpha^3 + R_{13} \times \alpha^2 + R_{21} \times \alpha + R_{29} \quad (6)$$

$$C_6 = R_6 \times \alpha^3 + R_{14} \times \alpha^2 + R_{22} \times \alpha + R_{30} \quad (7)$$

$$C_7 = R_7 \times \alpha^3 + R_{15} \times \alpha^2 + R_{23} \times \alpha + R_{31} \quad (8)$$

Similarly, where the number of stages of the shift register 342 is defined as M, and the number of times of cyclic addition is defined as J, values $C_n$ (n=0, 1, 2, . . . , M−1) within each shift register after J times of cyclic addition are expressed as the following equation (9).

[Formula 1]

$$C_n = \sum_{k=1}^{J} \alpha^{J-k} \times R_{(k-J)M+n} \quad (9)$$

Under the condition that spreading-code synchronization and carrier synchronization are established, when the cyclic addition as described above is continued over a plurality of bits (several tens of bits), the value $C_n$ (n=0, 1, 2, . . . , M−1) within the shift register 342 becomes a large value as a whole. Further, when the bit data transitions at random, $C_n$ (n=0, 1, 2, ..., M−1) shows characteristics that the value is a maximum value at a timing of the data marked with a circle in FIG. 4(d).

For example, in the example of FIG. 4, after the cyclic addition of the power data in FIG. 4(e) is performed at the illustrated cyclic-addition timings, the result at a time point when time for 16 bits has elapsed are illustrated in FIG. 4(f). Focusing on the power data in FIG. 4(e), under the condition that spreading-code synchronization and carrier-frequency synchronization are established, when the bit data transitions at random, the power data behaves like a triangular wave, but when there is no bit-data transition, the power data behaves like a direct current. Also, there is a relation in which a peak position of the triangular wave illustrated in FIG. 4(e) corresponds to a timing of the data marked with a circle in FIG. 4(d). Therefore, when the power data in FIG. 4(e) are power-integrated in bit periods, characteristics of $C_n$ (n=0, 1, 2, ..., M−1) become a large value on the whole while showing upwardly-convex characteristics, as illustrated in FIG. 4(f). A position at which a maximum value thereof is indicated corresponds to a timing of the data marked with a circle.

In FIG. 4(f), "maximum-value" data is illustrated with a black circle (•). That is, this maximum-value data are a correlation power that is obtained by power-integrating the cross-correlation value between a received signal obtained in a duration of the bit period and a spreading-code replica generated by the code generation unit 34. As illustrated in FIG. 4, under the condition that spreading-code synchronization and carrier synchronization are established, this maximum value (•) indicates a large value. In contrast, under the condition that spreading-code (or carrier-frequency) synchronization is not established, the maximum value (•) behaves differently and indicates a small value as illustrated in FIG. 5.

In the circumstances, the maximum-value detection/average-level measurement unit 350 in FIG. 3 receives each value $C_n$ (n=0, 1, 2, ..., M−1) within the shift register 342 as an input, and detects the maximum value from among $C_n$ (n=0, 1, 2, ..., M−1). The maximum-value detection/average-level measurement unit 350 then outputs the detected maximum value as a correlation-peak power (P), and also outputs a register number "n" (n=0, 1, 2, ..., M−1) that corresponds to a position of the maximum value as correlation-data timing information (CT). Further, the maximum-value detection/average-level measurement unit 350 obtains an average value of the values of $C_n$ (n=0, 1, 2, ..., M−1), and outputs the obtained average value as a correlation average power (AP).

FIG. 4 illustrates an operation example in which random bit transition has occurred. However, assuming that there is no bit transition such as an all-zero pattern, and spreading-code synchronization and carrier synchronization are established, $C_n$ (n=0, 1, 2, ..., M−1) does not show upwardly-convex characteristics, but shows that the values of $C_n$ are all at an equal level, and become large. In this case, at the position (CT) of the maximum value, a random value is indicated. However, the correlation average power (AP) is increased to the same level as the correlation peak power (P) in the case of the data transition. Therefore, even when the maximum-value detection/average-level measurement unit 350 selects any of the values of $C_n$ as the maximum value, a desired correlation peak power (P) can be obtained.

On the other hand, in the case where spreading-code synchronization or carrier synchronization is not established, the correlation peak power (P) lowers. For example, as illustrated in FIG. 5, when the spreading codes are out of synchronization, even when the received data are multiplied by the spreading code, bit data cannot be restored (see FIG. 5(c)). For this reason, an output of the band variable filter 310 that moving-averages the received data having been multiplied by the spreading code is also changed irregularly at a low level as illustrated in FIG. 5(d). In this case, a data sequence obtained by the power conversion of the power conversion unit 330 is also changed irregularly at a low level as illustrated in FIG. 5(e), and the register values $C_n$ (n=0, 1, 2, ..., M−1) after the cyclic addition all become small as illustrated in FIG. 5(f). Accordingly, when the spreading codes are out of synchronization, the correlation peak power (P) that is the maximum value of these register values, and the correlation average power (AP) also indicate a small value. Likewise, in the case of out-of-synchronization of the carrier where the carrier frequency is deviated by an amount equal to or greater than the bit rate, the correlation peak power (P) and the correlation average power (AP) indicate small values.

The correlation peak power (P) and correlation average power (AP) which are obtained by the correlation-power extraction unit 31 are inputted to the demodulation-processing control unit 80, and are used to determine whether it is possible to receive a desired signal, and to determine whether code synchronization and carrier synchronization are established, although illustration of connections thereof is omitted in FIG. 1.

In summary, in the case where spreading-code synchronization and carrier-frequency synchronization are established, based on the band limitation, the correlation-power cyclic addition in bit periods and the maximum-value detecting process performed by the correlation-power extraction unit 31, the correlation peak power (P) and the correlation average power (AP) that are outputted from the correlation-power extraction unit 31 indicate large values. On the other hand, in the case where at least one of the spreading-code synchronization and the carrier-frequency synchronization is not established, either the correlation peak power (P) or the correlation average power (AP) that is outputted from the correlation-power extraction unit 31 indicates a small value.

By utilizing the behavior as described above, the demodulation apparatus according to the present embodiment can establish each synchronization (spreading-code timing synchronization, carrier-frequency synchronization), and perform tracking of synchronization and data demodulation, even in a state where the spreading-code timing and the carrier-frequency deviation are unrecognizable, as described later.

Figure 6:
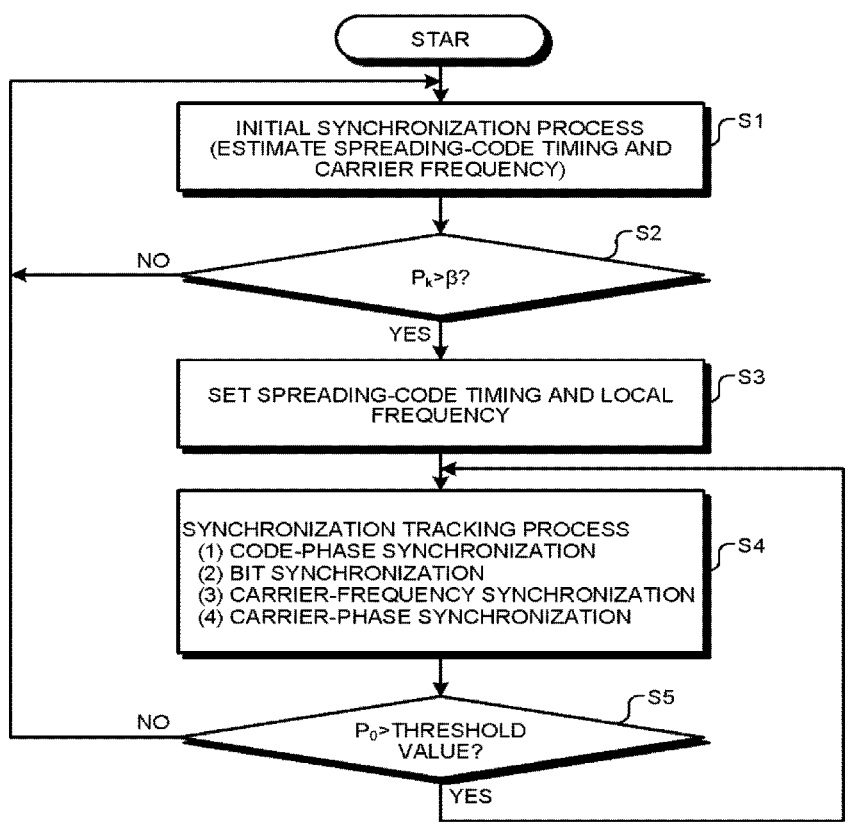
FIG. 6 is a flowchart illustrating an example of demodulation processing.

The demodulation processing performed by the demodulation apparatus in the present embodiment is described below. FIG. 6 is a flowchart illustrating an example of the demodulation processing performed by the demodulation apparatus in the present embodiment.

In the demodulation processing, first, the demodulation apparatus performs an initial synchronization process described below so as to estimate a spreading-code timing and a carrier frequency (Step S1). In this initial synchronization process, the demodulation-processing control unit 80 transmits a periodic shift command for a spreading-code replica to the code generation unit 34, and also transmits a periodic shift command for a local frequency to the carrier NCO unit 20. A range of the code shift is set to cover the length of a single spreading code, and a range of the local-frequency shift is set to cover a possible maximum carrier-frequency deviation.

Upon reception of the shift commands described above, the code generation unit 34 periodically changes (shifts) a timing for a spreading code (spreading-code replica) to be outputted to the multiplier 103 and the flip-flop 105, and the carrier NCO unit 20 periodically shifts the clock frequency of local signals (cos and sin signals) to be outputted to the quadrature detection unit 10.

The demodulation-processing control unit 80 controls the code generation unit 34 and the carrier NCO unit 20 in such a manner that the shifts do not simultaneously occur in both of the units. For example, in a state where the code generation unit 34 has a fixed timing for outputting the spreading code, the carrier NCO unit 20 periodically shifts the frequency of a local signal (hereinafter, referred to as "local frequency") by a certain step width within a specified range (within a range of local-frequency shift). Upon completion of the periodic local-frequency shift within the specified range, the code generation unit 34 shifts the spreading-code output timing by one sample, and in this state, the carrier NCO unit 20 periodically shifts the local frequency within the specified range in the manner as described above. Thereafter, by repeating the same procedure, the code generation unit 34 periodically shifts the spreading-code output timing within the specified range (within a range of the code shift).

The correlation-power extraction unit 31 obtains the correlation peak power ($P_k$, k=0, 1, 2, . . . , ab−1) and the correlation average power ($AP_k$, k=0, 1, 2, . . . , ab−1) for (a×b) pieces corresponding to a value of multiplication of the number of code shifts (a) and the number of local-frequency shifts (b). As already described above, the correlation peak power ($P_k$) and the correlation average power ($AP_k$) obtained by the correlation-power extraction unit 31 are inputted to the demodulation-processing control unit 80.

In the manner as described above, the demodulation-processing control unit 80 acquires, from the correlation-power extraction unit 31, a plurality of correlation peak powers ($P_k$) and correlation average powers ($AP_k$) which are obtained while changing the spreading-code timing and the local frequency two-dimensionally. The demodulation-processing control unit 80 extracts the correlation peak power $P_k$ indicating the maximum from the plurality of correlation peak powers ($P_k$) two-dimensionally obtained by the correlation-power extraction unit 31. Further, in order to confirm a reliability of the extracted correlation peak power $P_k$, the demodulation-processing control unit 80 compares the extracted correlation peak power $P_k$ with a certain constant β (threshold value) for example (Step S2).

When the correlation peak power $P_k$ satisfies the following equation (10) (YES at Step S2), the demodulation-processing control unit 80 determines that a signal is received normally, and sets the spreading-code timing and the local frequency at which the correlation peak power $P_k$ is obtained to the code generation unit 34 and the carrier NCO unit 20, respectively (Step S3). The code generation unit 34 starts outputting the spreading code at the set spreading-code timing, while the carrier NCO unit 20 starts generating a local signal with the set frequency.

$$P_k > \beta \quad (10)$$

Alternatively, as expressed by the following equation (10a), the reliability may be confirmed by comparing the correlation average power $AP_k$ with a certain constant β'.

$$AP_k > \beta' \quad (10a)$$

The demodulation-processing control unit 80 can detect signal reception of an all-zero pattern and other signal reception of other patterns (random pattern, 0101 pattern) based on the flowing equations, where γ represents a constant (threshold value).

$$P_k \leq AP_k \times \gamma \text{ (at the time of reception of all-zero pattern)} \quad (10b)$$

$$P_k > AP_k \times \gamma \text{ (at the time of reception of random pattern or 0101 pattern)} \quad (10c)$$

These pattern detections require the equation (10) or the equation (10a) to be satisfied, and unless either equation is satisfied, then the detection is invalid. Information regarding detection of these patterns is made useful for the demodulation apparatus alone to identify a state of the carrier synchronization and the bit synchronization. For example, the bit synchronization cannot be established unless the random pattern or the 0101 pattern is received, but this bit synchronization can be detected based on whether or not the above equation (10c) is satisfied.

On the other hand, when the equation (10) is not satisfied (NO at Step S2), it is determined that a signal is not received in a normal state, due to loss of signal and so on, and it is determined that the reliability of the conditions (a combination of the code-timing set value with the local-frequency set value) under which the correlation peak power $P_k$ has been obtained is low, and the initial synchronization process described above is repeated again.

In order to obtain (a×b) values of correlation power ((a×b)="number of code shifts (a)"×"number of local-frequency shifts (b)"), long time is required, which is expressed as "a×b×J [bit]" (where J represents the number of times of cyclic addition in bit periods said previously). Therefore, a plurality of correlation-power extraction units may be provided in parallel to perform parallel processing so as to reduce time.

For example, as illustrated in FIG. 1, not only the correlation-power extraction unit 31, but also the correlation-power extraction unit 30 and the correlation-power extraction unit 32 are provided, each of which has the same circuit configuration as the correlation-power extraction unit 31, and the three correlation-power extraction units are operated in parallel, thereby making it possible to reduce time required for the initial synchronization from "a×b×J [bit]" to "(a×b×J)/3 [bit]". Specifically, in FIG. 1, a spreading code outputted from the code generation unit 34 is delayed sample by sample through the flip-flops 104 and 105, and then given to each of the correlation-power extraction units (30, 31, and 32) so as to reduce the number of times to search the number of code shifts (a) to ⅓.

FIG. 1 illustrates a connection in which correlation peak powers ($P_{-1}$, $P_0$, $P_{+1}$) outputted from the correlation-power extraction units are inputted to the code-phase detection unit 33. This connection is a connection "at the time of code-phase synchronization" described later. In the initial synchronization process illustrated at Step S1 in FIG. 6, a signal does not flow through this connection. Although illustration of the connection relation is omitted in FIG. 1, at the time of initial synchronization, the correlation peak power ($P_k$) and the correlation average power ($AP_k$) obtained by each of the correlation-power extraction units (30, 31 and 32) are connected (inputted) to the demodulation-processing control unit 80.

In this case, while controlling the three correlation-power extraction units (30, 31 and 32), the demodulation-processing control unit 80 collects the correlation peak powers (P) and the correlation average powers (AP) that are simultaneously outputted by the correlation-power extraction units (30, 31, and 32). Based on the collected results, the demodulation-processing control unit 80 performs signal detection of the above equation (10), and setting of the code timing and the local frequency at which a correlation peak power $P_x$ is indicated.

In the present embodiment, an example in which three correlation-power extraction units are provided in parallel has been described. However, the number of correlation-power extraction units is not necessarily three, and may be further increased. In that case, the circuit size is increased by increase in the number of correlation-power extraction units, but on the other hand, time required for the initial synchronization can be reduced.

Figure 7:
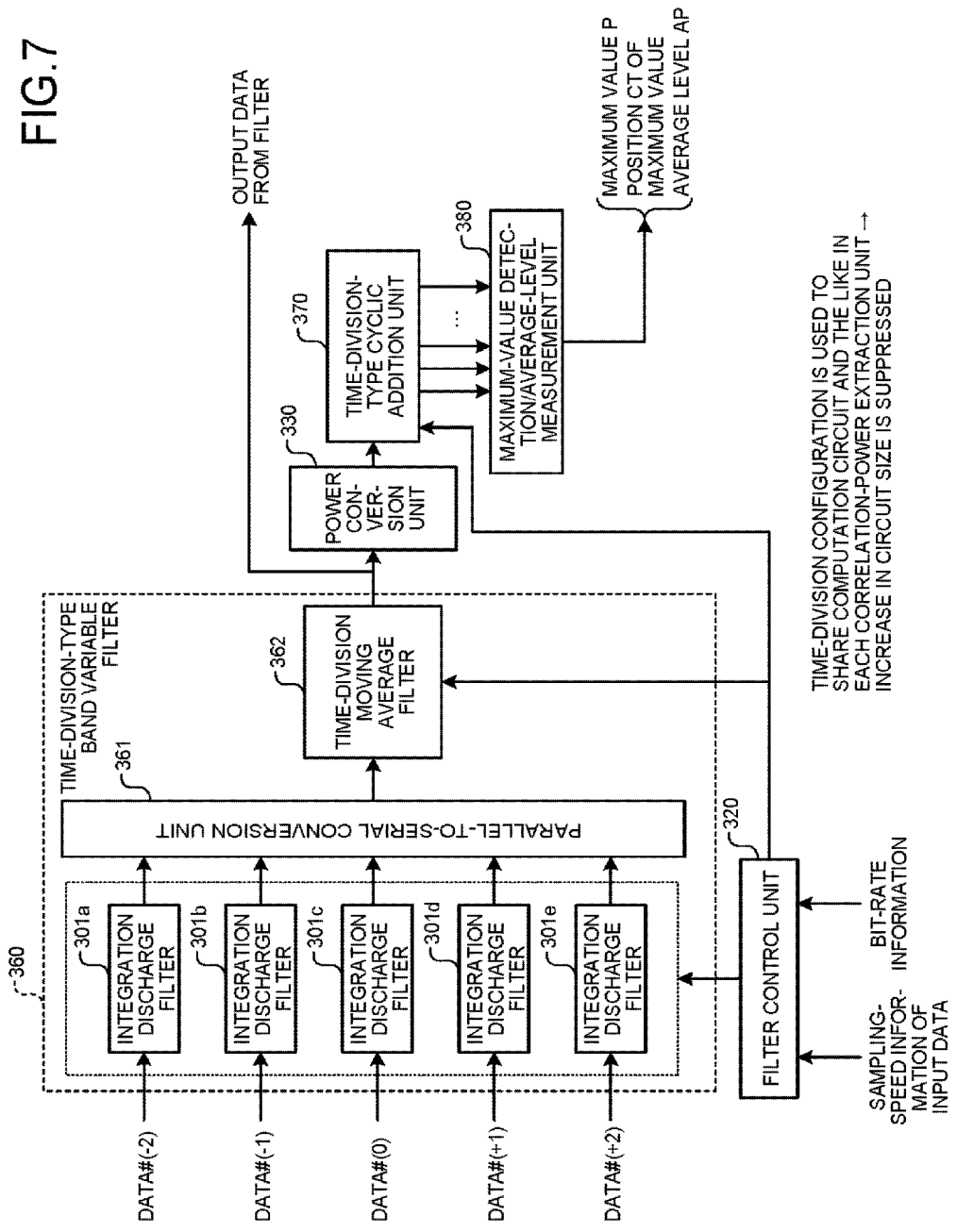
FIG. 7 is a diagram illustrating a modification of the correlation-power extraction unit.

In the case where the demodulation apparatus includes a plurality of correlation-power extraction units, increase in the circuit size can be suppressed by, for example, adopting a circuit configuration illustrated in FIG. 7. When the correlation-power extraction units are simply provided in parallel as described above, the circuit size is increased by the number of parallel correlation-power extraction units. Therefore, as illustrated in FIG. 7, the correlation-power extraction unit, except the integration discharge filter, is operated in a time-division manner so as to share a circuitry of a computation system including an adder and so on, thereby making it possible to reduce the circuit size.

The circuit illustrated in FIG. 7 corresponds to a circuit in which the band variable filter 310, the cyclic addition unit 340 and the maximum-value detection/average-level measurement unit 350 in the correlation-power extraction unit 31 illustrated in FIG. 3 are replaced with a time-division-type band variable filter 360, a time-division-type cyclic addition unit 370 and a maximum-value detection/average-level measurement unit 380.

The time-division-type band variable filter 360 includes integration discharge filters 301a to 301e, a parallel-to-serial conversion unit 361 and a time-division moving average filter 362. The integration discharge filters 301a to 301e are equal to the integration discharge filter 301 illustrated in FIG. 3. The parallel-to-serial conversion unit 361 rearranges data outputted in parallel by the integration discharge filters 301a to 301e to serial data.

FIG. 7 illustrates a configuration in which the circuit is implemented in a time-division manner, which is equivalent to a circuit constituted by five circuits arranged in parallel, each of which is equivalent to the correlation-power extraction unit 31 illustrated in FIG. 3.

The bit rate at output terminals of the integration discharge filters 301a, 301b, 301c, 301d and 301e are decreased to 16 times, for example. Therefore, even when the parallel-to-serial conversion unit 361 converts the parallel data from these integration discharge filters to serial data to multiplex the serial data in a five-time-division manner, the operating speed is 80 times as high as the bit rate. This degree of speed is less likely to exceed the upper limit of the device operating speed.

Hereinafter, five-time-division multiplexing is described as an example. The multiplexing number is not limited to five and the data can be multiplexed within a range that does not exceed the upper limit of the device operating speed.

Figure 8:
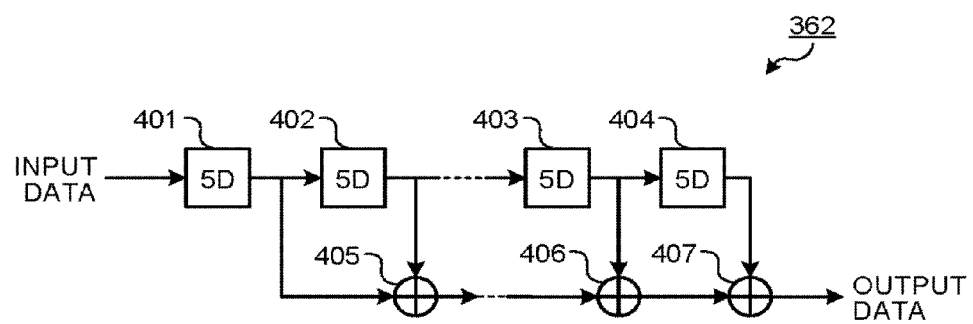
FIG. 8 is a diagram illustrating a configuration example of a time-division moving average filter.

The time-division moving average filter 362 by which 5-time-division is performed is configured as illustrated in FIG. 8, for example. As illustrated in FIG. 8, the time-division moving average filter 362 is configured to have five-stage shift registers (5D) 401 to 404, and adders 405 to 407. As illustrated in FIG. 8, a plurality of five-stage shift registers are connected in series, and outputs of them are added by the adders 405, 406 and 407, whereby a moving average result corresponding to five pieces of data including data #(−2) to data #(+2) can be obtained in a time-division manner. Because a baseband signal is handled in practice, two filters are required for an I-channel and a Q-channel, where each filter is as illustrated in FIG. 8.

The data outputted by the time-division moving average filter 362 in a time-division manner are converted to power data by the power conversion unit 330, and thereafter the after-converted power data are inputted to the time-division-type cyclic addition unit 370.

Figure 9:
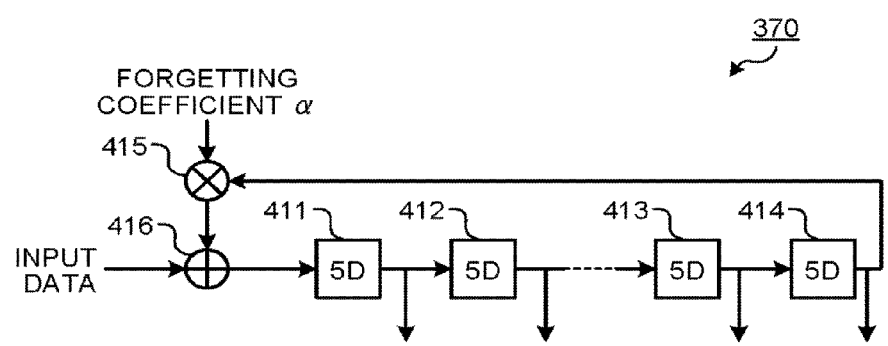
FIG. 9 is a diagram illustrating a configuration example of a time-division-type cyclic addition unit.

The time-division-type cyclic addition unit 370 is configured as illustrated in FIG. 9, for example. As illustrated in FIG. 9, the time-division-type cyclic addition unit 370 is configured to have five-stage shift registers (5D) 411 to 414, a multiplier 415 and an adder 416. As illustrated in FIG. 9, the time-division-type cyclic addition unit 370 inputs data inputted in a five-time-division manner to a register in which a plurality of five-stage shift registers (the five-stage shift registers 411, 412, 413 and 414) are connected in series. An output of the five-stage shift register 414 located at the final stage is multiplied by the forgetting coefficient α by the multiplier 415, and added to the input data by the adder 416, thereby forming an integral loop.

The maximum-value detection/average-level measurement unit 380 monitors an output from each of the five-stage shift registers (the five-stage shift registers 411, 412, 413 and 414), and thereby can monitor register values $C_n$ of five pieces of data, including the data #(−2) to the data #(+2), in a time-division manner. The maximum-value detection/average-level measurement unit 380 detects the maximum value of $C_n$ in the same manner as the maximum-value detection/average-level measurement unit 350. The maximum-value detection/average-level measurement unit 380 then outputs the detected maximum value as a correlation peak power (P), and outputs the correlation-data timing information (CT) that indicates a position of the maximum value, and the average value (AP) of $C_n$.

As described above, the circuit equivalent to a circuit provided with a plurality of circuits each corresponding to the correlation-power extraction unit 31 is configured in a time-division manner. By doing so, it is possible to suppress increase in circuit size of the moving average filter and the cyclic addition unit to only the number of register stages, and realize a configuration to share a single computation circuit for addition, subtraction and the like. In this case, the circuit can be downsized as compared to the case where circuits each corresponding the correlation-power extraction unit 31 are simply provided in parallel.

Referring back to the description of the demodulation processing illustrated in FIG. 6, the demodulation-processing control unit 80 determines that the condition set forth in Step S2, that is, the above equation (10) is satisfied, and sets the spreading-code timing at which the correlation peak power $P_x$ is obtained, to the code generation unit 34 and the local frequency to the carrier NCO unit 20. Next, the demodulation-processing control unit 80 performs a synchronization tracking process illustrated at Step S4. Specifically, the demodulation-processing control unit 80 performs each of processes of "(1) code-phase synchronization", "(2) bit synchronization", "(3) carrier-frequency synchronization", and "(4) carrier-phase synchronization". These processes are described below.

(1) Code-Phase Synchronization

The code-phase detection unit 33 detects a code-phase error from output values ($P_{-1}$, $P_0$, $P_{+1}$) of the correlation-power extraction units (the correlation-power extraction units 30, 31 and 32), and periodically executes feedback control to cancel the phase error for the code generation unit 34.

For example, in the configuration in FIG. 1, a spreading code is given to the multipliers 101 to 103 located upstream of the three correlation-power extraction units 30 to 32. The spreading code is given to the multiplier 101 with a +½ chip delay, to the multiplier 102 with a +0 chip delay, and to the multiplier 103 with a +½ chip lead.

Figure 10:
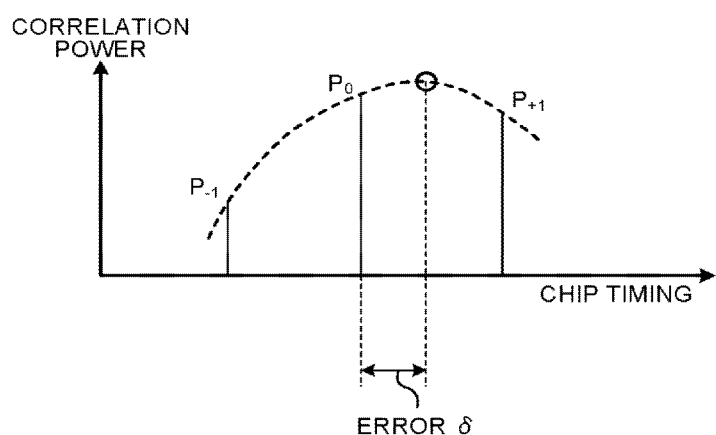
FIG. 10 is a chart for explaining an operation of a code-phase detection unit.

In this case, as described above, after satisfying the equation (10), the initial code-timing control has been already executed. Therefore, assuming that after this control, there is no influence of noise or the like, the correlation power $P_0$ outputted from the correlation-power extraction unit 31 indicates a maximum value, and correlation powers shifted by ±½ chip on the left and right sides of the correlation power $P_0$ ($P_{-1}$ outputted by the correlation-power extraction unit 30, and $P_{+1}$ outputted by the correlation-power extraction unit 30) have values each lower than $P_0$ and become equal to each other in value ($P_{-1}=P_{+1}$). However, when the code-timing control is not executed ideally due to the influence of noise or the like, the correlation power $P_0$ is decreased, and the relation described above tends to collapse ($P_{-1} \neq P_{+1}$), as illustrated in FIG. 10, for example. Further, even when the code-timing control is ideally executed, a gradual deviation is caused due to the subsequent influence of Doppler frequency or the like.

The code-phase detection unit 33 detects the error as described above from the output values ($P_{-1}$, $P_0$, $P_{+1}$) of the correlation-power extraction units (30, 31, 32), and periodically provides feedback control to cancel the phase error to the code generation unit 34. As illustrated in FIG. 10, a code-phase error δ may be derived by, for example, a method of quadratically interpolating three correlation powers ($P_{-1}$, $P_0$ and $P_{+1}$) to identify a peak point of the correlation characteristics (marked with a circle in FIG. 10), and detecting a timing error from a center point (position of $P_0$) of the chip timing to the identified peak point.

In the present embodiment, as illustrated in FIG. 1, there has been described a configuration in which three correlation-power extraction units (correlation-power extraction units 30, 31 and 32) are arranged in parallel on the condition that the code phase for obtaining each correlation power is shifted by ½ chip interval. However, the number of parallel correlation-power extraction units is not limited to three. Further, the code phase is not limited to ½ chip interval. For example, it can be configured such that the code phase for obtaining each correlation power is ¼ chip interval, and five correlation-power extraction units are arranged in parallel. When N correlation-power extraction units are arranged in parallel, N correlation powers are quadratically interpolated to identify a peak point of the correlation characteristics (marked with a circle in FIG. 10).

(2) Bit Synchronization

The clock generation unit 40 reproduces a bit clock based on the maximum-value position information (information regarding the position at which a maximum value of the correlation-peak power is obtained) outputted from the correlation-power extraction unit 31. By using this clock, the data latch unit 41 latches a data identification point from the output data of the correlation-power extraction unit 31.

The data latch unit 41 latches received data (data $D_i$ after band limitation) extracted by the band variable filter 310 in the correlation-power extraction unit 31. According to the process flow in FIG. 6, the clock generation unit 40 starts the operation after the spreading-code timing initial control and the local-frequency initial control. In this case, a correlation-power extracting process illustrated in FIG. 4 is performed, in which the clock generation unit 40 reproduces a bit clock for latching the data identification point (marked with a circle) after having passed through the filter in FIG. 4(*d*) based on the timing illustrated in FIG. 4(*f*), at which the maximum value of the respective powers obtained after the cyclic addition is indicated. The data latch unit 41 uses this regenerated bit clock to latch the data identification point (marked with a circle) after having passed through the filter in FIG. 4(*d*), and outputs the latched data identification point to the data determination unit 61, the carrier-phase detection unit 60 and the carrier-frequency deviation detection unit 50 that are located at the subsequent stage. This bit synchronization process is identical to the process disclosed in Japanese Patent No. 5094469 (timing reproduction device and receiving device).

(3) Carrier-Frequency Synchronization

The carrier-frequency deviation detection unit 50 starts its operation when the code-timing initial control and the local-frequency initial control are finished.

Because the local-frequency initial control has been already finished, carrier-frequency initial synchronization is established. However, assuming that an uncontrolled state continues as is, carrier frequency synchronization tends to collapse due to the Doppler-frequency deviation or the like. Therefore, the carrier-frequency deviation detection unit 50 obtains a reception phase indicated by the data identification point latched by the data latch unit 41 described above, and obtains a residual carrier-frequency deviation based on a difference value of the previous and subsequent reception-phase data. Upon obtaining the residual carrier-frequency deviation, the carrier-frequency deviation detection unit 50 periodically executes feedback control to cancel this deviation for the carrier NCO unit 20.

For example, in a case of using binary phase shift keying (BPSK) for primary modulation, the received data are {0, π}, and the phase modulation is repeated at random. Upon making subtraction of phases prior and posterior by one bit (=upon performing delay detection of phase), the subtraction result indicates either of {0, π} when there is no residual carrier-frequency deviation. Further, when there is a residual carrier-frequency deviation Δθ [deg/bit], the subtraction result indicates either of {Δθ, π+Δθ}.

Therefore, the carrier-frequency deviation detection unit 50 performs 1-bit delay detection on received phase data indicated by the above data identification point, for example, and thereafter degenerates and averages the detection result with the phase range π (modulo π), thereby making it possible to extract the residual carrier-frequency deviation Δθ.

A specific example is illustrated, in which even when a modulo π process is performed on the subtraction result Δθ, Δθ remains unchangeably, and when the modulo π process is performed on the subtraction result π+Δθ, Δθ is obtained. Therefore, Δθ is obtained in either case. In the manner as described above, while removing the above BPSK modulation components {0, η}, the carrier-frequency deviation detection unit 50 can extract the residual carrier-frequency deviation Δθ.

In the case of using quadrature phase shift keying (QPSK), the received data are {0, π/2, π, −π/2}, and its phase modulation is repeated at random. Therefore, it suffices that the carrier-frequency deviation detection unit 50 changes the above modulo π process to a modulo π/2 process, and performs the modulo π/2 process in the same manner.

In a case of receiving a signal from a transmitter in which a spreading code and a carrier share the same oscillator, a value obtained by assigning weights of "chip rate/carrier frequency" to the obtained residual carrier-frequency deviation Δθ [deg/bit] is a code-frequency deviation. Therefore, in the case of receiving a signal from a transmitter in which the spreading code and the carrier share the same oscillator, the carrier-frequency deviation detection unit 50 may correct the spreading-code frequency for the code generation unit 34 based on the obtained residual carrier-frequency deviation Δθ information.

By the series of the processes described above, the demodulation apparatus according to the present embodiment can establish carrier-frequency synchronization.

(4) Carrier-Phase Synchronization

Upon establishing the above carrier-frequency synchronization, only a carrier-phase offset component remains. This carrier-phase offset component does not have always a fixed value, and is moderately changed according to phase noise or the carrier-frequency synchronization error.

Therefore, the carrier-phase detection unit 60 extracts this carrier-phase offset component, and gives it to the data determination unit 61. The data determination unit 61 corrects a vector angle of the data identification point latched by the data latch unit 41 located at the previous stage, using the carrier-offset component as a reference axis.

The carrier-phase offset component can be extracted by performing a nonlinear process on the data identification point to remove a modulation component, and then averaging the resultant component. For example, a specific extraction method is disclosed in Japanese Patent No. 3498600 (carrier-phase estimation device and demodulator using the carrier-phase estimation device).

The data determination unit 61 uses the above carrier offset component $Q_i$ to derive the vector angle of the data identification point $D_i$ based on the following equation (11). Further, based on amplitude data $A_i$ after vector angle correction, the data determination unit 61 determines the demodulated data {0, 1}.

$$A_i = D_i \times \exp[-jQ_i] \quad (11)$$

As described above, the demodulation apparatus according to the present embodiment obtains a cross-correlation power of a bit-data width by performing a series of signal processings in the correlation-power extraction unit(s), and achieves spreading-code synchronization and carrier synchronization for the demodulation apparatus.

The demodulation-processing control unit 80 monitors the correlation peak power $P_O$ obtained by the correlation-power extraction unit 31, so as to determine whether or not spreading-code synchronization and carrier-frequency synchronization can be currently maintained. That is, the demodulation-processing control unit 80 monitors whether or not $P_O$ is maintained in a state where $P_O$ is larger than a predetermined threshold value (Step S5). When $P_O$ cannot be maintained in this state (NO at Step S5), the demodulation-processing control unit 80 determines that out-of-synchronization has occurred. In this case, the process returns to Step S1, and the demodulation-processing control unit 80 controls the code generation unit 34 and the carrier NCO unit 20 in such a manner as to perform a process of estimating the spreading-code timing and the carrier frequency, and a process subsequent to this estimation process. When $P_O$ can be maintained in a state where $P_O$ is larger than the predetermined threshold value (YES at Step S5), the demodulation-processing control unit 80 controls the code-phase detection unit 33, the clock generation unit 40, the carrier-frequency deviation detection unit 50, and the carrier-phase detection unit 60 in such a manner as to continue the synchronization tracking process described at Step S4. A synchronization tracking unit is implemented by the code-phase detection unit 33, the clock generation unit 40, the carrier-frequency deviation detection unit 50, the carrier-phase detection unit 60, and the demodulation-processing control unit 80.

As described above, the demodulation apparatus according to the present embodiment is configured not to perform cross-correlation in spreading-code periods, but to perform cross-correlation in bit-data widths. Therefore, even in a case where the bit-data period and the spreading-code period are in a non-integral-multiple relation, there are no constraints on the demodulation processing, and this can prevent the demodulation performance (synchronization performance) from being deteriorated.

Further, the demodulation apparatus according to the present embodiment does not additionally use a pilot signal for synchronization in the demodulation apparatus, and therefore can achieve satisfiable bit-error rate characteristics at low transmission power without multiplex of a pilot signal.

While in the present embodiment, descriptions have been made according to the flow illustrated in FIG. 6, the process does not necessarily follow this flow. For example, it may be contemplated that a system in which a pilot signal is additionally code-multiplexed does not perform a process of Step S1 or S2 in FIG. 6, and instead, uses a pilot signal to perform initial code-timing synchronization and initial local-frequency synchronization. In this way, when initial code-timing synchronization and initial local-frequency synchronization can be established by another method, the present embodiment may be applied only to the synchronization tracking process illustrated at Step S4. That is, the correlation peak power ($P_x$) obtained by each correlation-power extraction unit, the position (CT) at which the correlation peak power is obtained, and the correlation average power ($AP_x$) may be used only in the synchronization tracking process.

Second Embodiment

In the first embodiment, data modulation and also a variable bit rate are achieved even when the bit period and the spreading-code period are in a non-integral-multiple relation.

In this embodiment, there is described a method of achieving the same effects as those in the first embodiment, and achieving a variable bit rate even when a sampling speed is a non-integral-multiple of the bit rate.

In the first embodiment, when the sampling speed of input data is 320 times as high as the bit rate, the number of stages D of the integration discharge filter 301 is set to D=20, thereby making it possible to reduce the operating speed on or after the output of the integration discharge filter 301 to 16 (=320/20) times as high as the bit rate.

If a sampling speed of the input data is a non-integral multiple of the bit rate, such as when the sampling speed is 331.127 times as high as the bit rate, in the case where D=20 is set, the operating speed on or after the output of the integration discharge filter 301 is 16.55635 (=331.127/20) times as high as the bit rate, resulting in a non-integral-multiple relation. In this state, when the number of moving-average stages in the moving-average filter 302 located at the subsequent stage, and the number of stages of the shift register 342 in the cyclic addition unit 340, are set to 16 stages, a clock-frequency deviation corresponding to the rate (=16.55635/16) is caused on or after the integration discharge filter's process. This leads to deterioration of synchronization characteristics, and deterioration of bit-error rate characteristics. Even when D=21 is set in order to reduce the error, the operating speed on or after the output of the integration discharge filter 301 is 15.76795238 (=331.127/21) times as high as the bit rate, resulting in a non-integral-multiple relation, and thereby a clock frequency deviation corresponding to the rate (=15.76795238/16) is caused on or after the integration discharge filter's process.

Therefore, in the second embodiment, in the case where the sampling speed is a non-integral multiple of the bit rate, the number of stages D in the integration discharge filter 301 is not fixedly set to a value of either 16 or 17, but is dynamically controlled by the filter control unit 320.

For example, as described above, in the case where the sampling speed is 331.127 times as high as the bit rate, by dynamically switching D∈{20, 21} at a certain frequency, the sampling speed on or after the output of the integration discharge filter 301 is averagely set to 16 times as high as the bit rate. Specifically, the number of stages D in the integration discharge filter 301, and its switchover frequency are derived from the following calculation.

Where the data sampling speed upstream of the integration discharge filter is defined as Fs, and the bit rate is defined as Rb, the number of oversamples with respect to the bit rate is expressed as "Ovs=Fs/Rb". At this time, where the average number of oversamples (target OVS) with respect to the bit rate after the output of the integration discharge filter is defined as Ots, it suffices to set the number of stages D in the integration discharge filter to Ovs/Ots. D is not always an integer.

In the above example, since Ovs=331.127 and Ots=16, D=20.6954375 is obtained, which is a fractional value. It is assumed that D satisfies the following relation with an integer $D_{INT}$.

$$D_{INT}+1>D\geq D_{INT} \quad (12)$$

In the above example, 21>20.6954375≥20 is derived. In this case, "b" and "a" may be decided such that the following equation (13) holds approximately.

$$\{(D_{INT}+1)b+(D_{INT})a\}/(a+b)=D \quad (13)$$

The equation (13) is expanded as follows.

$$\{(D_{INT}+1)b+(D_{INT})a\}=D\times(a+b)$$

$$(D_{INT}-D)a=(D-D_{INT}-1)b$$

$$a=(D-D_{INT}-1)b/(D_{INT}-D) \quad (14)$$

In the above example, by assigning each value to the equation, a=0.4379437405×b holds.

The filter control unit 320 sets the values of "a" and "b" such that the above equation (14) holds approximately. For example, b=10000 and a=4379 are set. In this case, it suffices to execute control for switching the number of stages D∈{20 stages, 21 stages} in the integration discharge filter at a frequency of "4379:10000". In other respect, it suffices to set the number of stages in the moving average filter 302, and the number of stages in the shift register 342 within the cyclic addition unit 340, to 16 stages.

At the time of switching the number of stages D∈{20 stages, 21 stages} in the integration discharge filter at the frequency of "4379:10000", the value of D is controlled not to be time-biased in such a manner that the integration discharge filter is operated with D=21 twice, and then the integration discharge filter is operated with D=20 once (example: the value of D is switched as 21→21→20→21→21→20 . . . so as to control the number of times of the occurrence to be "4379:10000" when the number of times of the operations reaches 14379).

By the procedure described above, the modulation apparatus according to the second embodiment can achieve, in addition to the effects described in the first embodiment, satisfiable characteristics similarly to the first embodiment by means of minor circuit addition of only adding control for dynamically switching the number of stages in an integration discharge filter, even though the sampling speed is a non-integral multiple of the bit rate.

Dynamic control on the number of stages in the integration and discharge filter described in the second embodiment is widely applicable under the condition that the sampling speed is a non-integral multiple of the bit rate. This dynamic control can be applied not only to a system in which the bit-data period and the spreading-code period are in a non-integral-multiple relation, but also to a communication system with an integral-multiple relation between them, and a communication system using a pilot signal for synchronization.

Further, in the second embodiment, an example of dynamic control for an integration discharge filter based on the equation (14) has been described. However, the dynamic control is not necessarily based on the equation (14). Any equation can be used, as long as control for dynamically switching between two numbers of stages is executed such that the desired number of oversamples is approximately reached.

INDUSTRIAL APPLICABILITY

As described above, the demodulation apparatus according to the present invention is useful as a demodulation apparatus constituting a communication device on the receiving side of a spread spectrum communication system.

REFERENCE SIGNS LIST 10 quadrature detection unit, 20 carrier NCO unit, 30, 31, 32 correlation-power extraction unit, 33 code-phase detection unit, 34 code generation unit, 40 clock generation unit, 41 data latch unit, 50 carrier-frequency deviation detection unit, 60 carrier-phase detection unit, 61 data determination unit, 80 demodulation-processing control unit, 101, 102, 103, 343, 415 multiplier, 104, 105 flip-flop, 301, 301a, 301b, 301c, 301d, 301e integration discharge filter, 302 moving average filter, 310 band variable filter, 320 filter control unit, 330 power conversion unit, 340 cyclic addition unit, 341, 405, 406, 407, 416 adder, 342 shift register, 350, 380 maximum-value detection/average-level measurement unit, 360 time-division-type band variable filter, 361 parallel-to-serial conversion unit, 362 time-division moving average filter, 370 time-division-type cyclic addition unit, 401, 402, 403, 404, 411, 412, 413, 414 five-stage shift register.

The invention claimed is:
1. A demodulation apparatus that demodulates spectrum-spread received data, the apparatus comprising:
an integration discharge filter that integrates despread received data for each constant time section;
a moving average filter that performs moving average on an integrated value output from the integration discharge filter;
a power conversion unit that converts each sample value of data obtained after the moving average to a power value;

a cyclic addition unit that cyclically adds the power value in bit periods of received data;

a clock generation unit that generates a bit clock for latching the data obtained after the moving average, based on a result of the cyclic addition; and a filter control unit that controls the time section based on a sampling rate and a bit rate of the received data, wherein when the sampling rate is a non-integral multiple of the bit rate, the filter control unit periodically switches the time section at a timing decided based on a result obtained by dividing the sampling rate by the bit rate.

2. The demodulation apparatus according to claim 1, wherein the clock generation unit generates the bit clock for latching the data obtained after the moving average based on a maximum value of the result of the cyclic addition.

3. The demodulation apparatus according to claim 1, further comprising:

an estimation unit that estimates a state of synchronization of the demodulation apparatus based on the result of the cyclic addition, wherein the demodulation apparatus controls a code phase, a carrier frequency and a carrier phase based on a result of the estimation of the estimation unit.

4. A demodulation apparatus that demodulates spectrum-spread received data, the apparatus comprising:

a first filter configured to integrate despread received data for each constant time section;

a second filter configured to perform moving average on an integrated value output from the first filter; and circuitry configured to convert each sample value of data obtained after the moving average to a power value;

cyclically add the power value in bit periods of received data;

generate a bit clock for latching the data obtained after the moving average, based on a result of the cyclic addition; and control the time section based on a sampling rate and a bit rate of the received data, wherein when the sampling rate is a non-integral multiple of the bit rate, the circuitry is configured to periodically switch the time section at a timing decided based on a result obtained by dividing the sampling rate by the bit rate.

5. The demodulation apparatus according to claim 4, wherein the circuitry is configured to generate the bit clock for latching the data obtained after the moving average based on a maximum value of the result of the cyclic addition.

6. The demodulation apparatus according to claim 4, wherein the circuitry is configured to estimate a state of synchronization of the demodulation apparatus based on the result of the cyclic addition.

7. The demodulation apparatus according to claim 6, wherein the circuitry is configured to control a code phase, a carrier frequency and a carrier phase based on a result of the estimation of the state of synchronization.

8. A demodulation apparatus that demodulates spectrum-spread received data, the apparatus comprising:

a first filter configured to integrate despread received data for each constant time section;

a second filter configured to perform moving average on an integrated value output from the first filter; and circuitry configured to convert each sample value of data obtained after the moving average to a power value;

cyclically add the power value in bit periods of received data;

estimate a state of synchronization of the demodulation apparatus based on a result of the cyclic addition;

generate a bit clock for latching the data obtained after the moving average based on the result of the cyclic addition; and control the time section based on a sampling rate and a bit rate of the received data, wherein when the sampling rate is a non-integral multiple of the bit rate, the circuitry is configured to periodically switch the time section at a timing decided based on the sampling rate and the bit rate.

9. The demodulation apparatus according to claim 8, wherein the circuitry is configured to control a code phase, a carrier frequency and a carrier phase based on a result of the estimation of the state of synchronization.

10. The demodulation apparatus according to claim 8, wherein the circuitry is configured to generate the bit clock for latching the data obtained after the moving average based on a maximum value of the result of the cyclic addition.

* * * * *